United States Patent [19]

Hawes

[11] Patent Number: 6,026,436
[45] Date of Patent: Feb. 15, 2000

[54] SYSTEM FOR CLONING DOCUMENT PROCESSING RELATED SETTINGS IN A DOCUMENT PROCESSING SYSTEM

[75] Inventor: M. Kerrigan Hawes, Pittsford, N.Y.

[73] Assignee: Xerox Corporation, Stamford, Conn.

[21] Appl. No.: 08/975,465

[22] Filed: Nov. 21, 1997

[51] Int. Cl.[7] .................................................. G06F 13/00
[52] U.S. Cl. .......................................... 709/218; 709/229
[58] Field of Search .................................... 395/101, 114, 395/115; 709/220–224, 229, 218

[56] References Cited

U.S. PATENT DOCUMENTS

| | | | |
|---|---|---|---|
| 4,839,829 | 6/1989 | Freedman | 364/519 |
| 5,220,674 | 6/1993 | Morgan et al. | 395/800 |
| 5,692,111 | 11/1997 | Marbry et al. | 395/114 |
| 5,819,042 | 10/1998 | Hansen | 709/222 |
| 5,828,855 | 10/1998 | Walker | 710/129 |
| 5,887,139 | 3/1999 | Madison, Jr. et al. | 709/223 |
| 5,905,906 | 5/1999 | Goffinet et al. | 395/114 |
| 5,956,487 | 9/1999 | Venkatraman et al. | 395/200.48 |

OTHER PUBLICATIONS

Xerox MRP Family 4220/MRP, 4230/MRP—System Administrator Guide (Administrator Utility); Publication Number: 720P13952.

*Primary Examiner*—Zarni Maung
*Attorney, Agent, or Firm*—Gary B. Cohen; Richard F. Spooner

[57] ABSTRACT

A document processing system is provided in which a first document processing related device, having a set of document processing related settings or settings, is disposed remotely of a second document processing related device on a network. A browser is used to get an electronic page for the first document processing related device and information regarding a location of the second document processing on the network is written in the electronic page with the browser. The electronic page with the written information is posted to the first document processing related device and a server provides the electronic page with a subset of the set of document processing related settings or settings. The browser then submits the electronic page with the subset of the set of document processing related settings to the second document processing related device for programming the second document processing related device with the subset of the set of document processing related settings.

15 Claims, 8 Drawing Sheets

FIG. 7

SYSTEM FOR CLONING DOCUMENT PROCESSING RELATED SETTINGS IN A DOCUMENT PROCESSING SYSTEM

BACKGROUND

This invention relates generally to network document processing and, more particularly, to a system for copying properties/settings of one document processing device (e.g. a first network printer) to another document processing device (e.g. a second network printer).

Currently a substantial number of document processing devices (e.g. printers, scanners, routers, communicate with one another by way of a network. In one example, a workstation (commonly referred to as a "client") includes one or more applications which each create an electronic document in graphic device interface (gdi) format, which gdi format is then converted into a page description language (pdl) format for transmission to a printer for processing (including, for example, rasterizing). In creating the electronic document, the client is constrained by selected properties or settings to which the printer is subject. For example, one printer may include a host of image processing related properties which may not be available at another printer.

As disclosed by U.S. Pat. No. 5,220,674 to Morgan et al. (Issued: Jun. 15, 1993), a client, in a typical network environment, may have access to multiple printers by way of a server. More particularly, U.S. Pat. No. 5,220,674 discloses a local area print server which functions in cooperation with a plurality of clients and a plurality of printers to facilitate communication between the clients and the printers. As shown, the local area print server both controls the servicing of printer requests by a printer and, in response to printer requests for resources needed to satisfy a printing request, either provides required resources, or obtains the resources from remote subsystems.

As suggested by U.S. Pat. No. 5,564,109 to Snyder (Issued: Oct. 8, 1996), one printing device within the multiple printer arrangement of U.S. Pat. No. 5,220,674 can possess a set of printing parameters which varies from that of another printing device within the same arrangement. This variation among printing parameter sets can, as taught by '109 Patent, be advantageous to a user in that the user is provided with the capability to choose a printing device based on the particular needs of a user's document or job. More particularly, a directory of available peripheral devices, together with a disclosure of the current configuration of setup parameters of each device, is provided to a client so that the client can select the peripheral device best suited for a particular job. The directory may provide a ranking of the peripheral devices according to fit with the selected setup parameters and a predetermined ordering of the importance of each parameter. The directory may be limited to only those document production apparatuses which are capable of being configured in accordance with the operator's selection of setup parameters; or the directory may include all document production apparatuses on the network, letting the operator modify the parameter selection to fit the available configurations if necessary.

When using a multiple printer arrangement in which multiple parameter sets are provided, it is desirable to provide a significant level of network management for the devices. One important aspect of network management includes configuring the parameters of a device, e.g. printer, pursuant to adding the device to the network. As is known, such configuration or setup can be performed manually on site or semi-automatically from a remote administration client. In one example of manual setup, an administrator prints out a configuration sheet from a configured device and uses that as a reference to initialize the parameters for a newly installed device.

While the manual approach is suited for those situations where the administrator is disposed in close proximity to the newly installed device, it can be undesirable when the newly installed device and the administrator are not in close proximity. As is known, devices can be separated from one another by many miles (kilometers) in even a relatively small local area network (LAN). In those situations where an administrator is required to manage a LAN or wide area network, it is desirable to employ some sort of administrative utility or application. Xerox Corporation provides an administrative utility for its 4220/4230 printer group which permits printer control panel functions to be manipulated from a remote administrative client. The utility runs under DOS on an IBM-compatible computer and provides a user-friendly graphic interface for communicating with the printer. Using the utility, a client can remotely query the status of the printer, print reports, configure default printer parameters, and manage fonts and forms stored on the printer.

Another limitation of the manual approach is that the features of the Control Panel are often severely limited by the need to reduce cost. This typically makes it difficult to enter numbers and extremely difficult to enter alphanumeric strings. The remote administrative clients do not suffer from the Control Panel limitations.

Network management can, as disclosed by U.S. Pat. No. 4,839,829 to Freedman (Issued: Jun. 13, 1989), be carried even beyond the interaction described above for the Xerox administrator utility. More particularly, U.S. Pat. No. 4,839,829 is directed toward an administration system employing a computer network which is programmed in such a manner that a printing requester or user can interface, through the computer network, with a printing facility for the printing or publishing of a work or job. More specifically, the system interacts with a user for collecting and storing information or parameters regarding the user's needs (i.e., cost requirements, photos, pictures, graphics, deadlines, number of documents to be printed, colors used, kinds of paper, typeface to be used, etc.). The system then compares the information from the user with stored information relating to the printed work design and capabilities of various printing facilities (i.e., types of printing equipment available, for example, offset presses, paper cutters and/or binding equipment, operating costs, time, process requirements, etc.).

The system also evaluates which printing facility and/or particular type of printing equipment is most compatible with the user's specific printing needs. The evaluation is presented typically over a conventional telephone network or through a direct local network to the user to permit the user to select and execute a particular course of action based on the various available options. In addition, the system is designed to handle all of the administrative details (orders, billing, etc.) involved with such a printing job. Furthermore, the system's interactive nature is well suited for monitoring and modifying a previously selected printing job order while the printing job is in progress.

Network communication promises to be advanced through use of the "Internet" or "World Wide Web" (www). On the increasingly popular www, hypertext markup language (html) specifies the display of information on a "client" computer, and hypertext transfer protocol (http)

provides a neutral mechanism for the transfer of information from a "server" computer to a "client" computer over the TCP/IP network protocol. Of particular interest is the neutral aspect, in which the transfer and display of information does not depend on the client computers operating system or processor configuration, but only on the capabilities of a protocol-compliant "browser". Such software is widely available for most computers at this time. Information transferred and displayed to the client includes both static information defined in advance and dynamic information computed at the time that a client makes a request to the server. Publicly available server software often includes the common gateway interface (CGI) which allows the server to invoke a software program which may be passed using specified parameters, and whose output will be transferred to, and displayed on the client computer.

Print and document processing machines can use html and http as interfaces for control and status, and design of these machines benefits greatly from use of such interfaces for several reasons. First, development costs are lower and deployment schedules shorter since the mechanism can be used by many clients without the necessity of writing the client display software (often referred to as "user interface" or UI) for each operating system and processor that clients use. Second, it is straightforward to define multi-lingual interfaces by storing the information in multiple languages on the server, permitting the server to be accessed in multiple languages by different clients concurrently. Third, upgrades or changes can be made to the print or document processing machine's capabilities without the inconvenience of the vendor developing new client display software and of the client having to install new software on every client computer for each such upgrade.

While Xerox' administration utility and the system of U.S. Pat. No. 4,839,829 are well suited for gathering information on a network and/or configuring parameters of a selected printer, they do not necessarily provide device configuration capability to the widest range of network users possible. More particularly, it is believed that a client who does not run some sort of administration utility or is not part of a communication system (such as that disclosed by U.S. Pat. No. 4,839,829) is not in a position to configure printers on the network. While the www has been used extensively to gather information, by way of browsing, its full capabilities have not been exploited fully. It would be desirable to provide a system that employs browsing capability for making network device configuration capability available to as many network users as possible.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include the following patents assigned to Xerox Corporation: U.S. Pat. Nos. 5,243,518; 5,226,112; 5,170,340; and 5,287,194. Some patents on this subject assigned to others include U.S. Pat. Nos. 5,113,355; 5,113,494 (originally filed Feb. 27, 1987); U.S. Pat. Nos. 5,181,162; 5,220,674; 5,247,670; 4,953,080; and 4,821,107. Further by way of background, some of the following U.S. patents assigned to Xerox Corporation also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Japan. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" " . . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, A New Personal Computer . . . "; "Xerox System Integration Standard Printing Protocol XSIS 118404", April 1984; "Xerox Integrated Production Publishers Solutions: . . . " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sep. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed above in this Background are incorporated herein by reference.

SUMMARY OF THE INVENTION

In accordance with one aspect of the present invention, there is provided a document processing system including a plurality of document processing related devices in which each of the document processing related devices communicates with one another by way of a network. The document processing system includes: a first document processing related device with a set of document processing related settings, said document processing related device being programmed with the set of document processing related settings and including a writing service for writing a subset of the set of document processing related settings to one or more electronic pages; a second document processing related device communicating with said first document processing related device and including a property programming service for programming said second document processing related device with the subset of the set of document processing related settings; and a network browsing system, communicating with both the writing service of said first document processing related device and the programming service of said second document processing related device, for causing the one or more electronic pages with the subset of the set of document processing related settings to be submitted from said first document processing related device to said second document processing related device so that the subset of the set of document processing related settings is read by the programming service, when a preselected condition is met, to program said second document processing related device in response to said reading of the subset of the set of document processing related settings by the programming service.

In accordance with another aspect of the present invention there is provided a method for use in document processing system with a first document processing related device communicating with a second document processing related device by way of a network. The first document processing related device includes a set of document processing related settings and a service for obtaining a subset of the set of document processing related settings. The second document processing related device includes a service for programming the second document processing related device with the subset of the set of document processing related settings. The document processing system includes a browser communicating with both the first document processing related device and the second document processing related device. The method, which permits copying of the subset of the set of document processing related settings from the first document processing related device to the second document processing related device, includes the steps of: a) using the browser to get an electronic page for the first document processing related device; b) writing information in the electronic page, with the browser, to identify a location of the second document processing related device; c) posting the electronic page with the written information to the first document processing related device; d) using the obtaining service to provide the electronic page with the subset of the set of document processing related settings; and e) using the browser to submit the electronic page with the subset of the set of document processing related settings to the second document processing related device for programming the second document processing related device with the subset of the set of document processing related settings.

BRIEF DESCRIPTION OF THE DRAWINGS

FIGS. 6 and 7 conjunctively represent an elevational view of a dialog suitable for use as a "Properties Form" with the system of FIG. 4;

DESCRIPTION OF PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
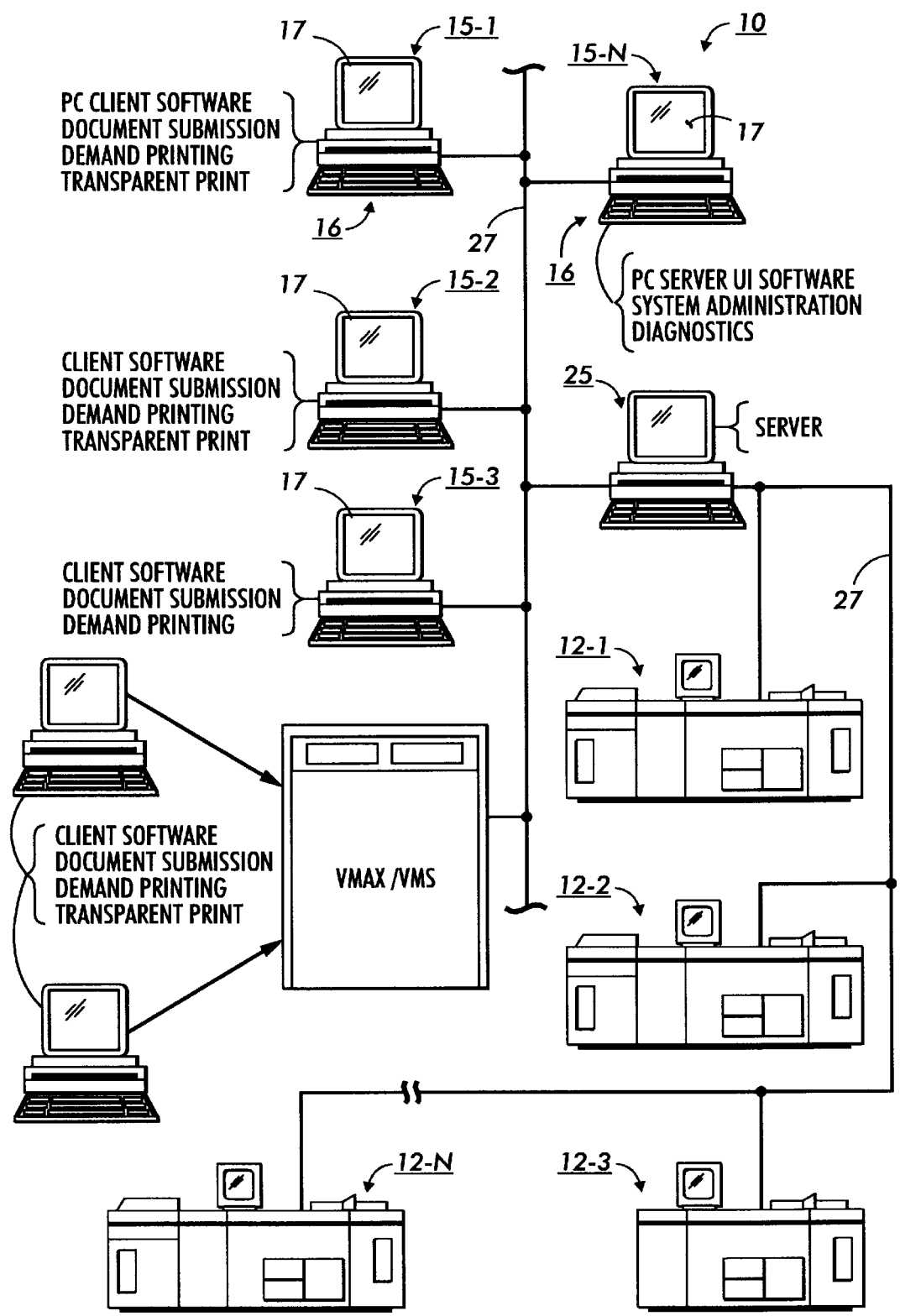
FIG. 1 is a schematic, elevational view of a network printing system.

Referring to FIG. 1, there is shown a network document processing system 10 of the type adapted to incorporate the present invention. Processing system 10 comprises a plurality of printers 12-1, 12-2, 12-3, . . . 12-$n$ for processing print jobs and making prints in accordance with the job programming instructions for each job printed. Each of printers 12-1, 12-2, 12-3, 12-$n$ may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities as will appear. As used herein, printers 12-1, 12-2, 12-3, . . . 12-$n$ include virtual printers of the type disclosed by U.S. Pat Nos. 5,371,837 and 5,450,571.

System 10 provides print processing for various workstations or clients 15-1, 15-2, 15-3, . . . 15-$n$. Clients 15-1, 15-2, 15-3, . . . 15-$n$, which may be remote and/or on site, are operatively coupled to printers 12-1, 12-2, 12-3, 12-$n$ through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1, 15-2, 15-3, . . . 15-$n$ may have a document scanner, disk input, keyboard, fax, etc. for generating the electronic documents that comprise the job to be printed. Clients 15-1, 15-2, 15-3, . . . 15$n$ have a User Interface (UI) 16 with interactive screen 17 enabling programming selections for print jobs to be made, screen 17 displaying the various programming selections available in the form of an electronic job ticket as will appear. Printers 12-1, 12-2, 12-3, . . . 12-$n$, clients 15-1, 15-2, 15-3, . . . 15-$n$, and server 25 are communicatively interconnected by network or communication channels 27.

Figure 2:
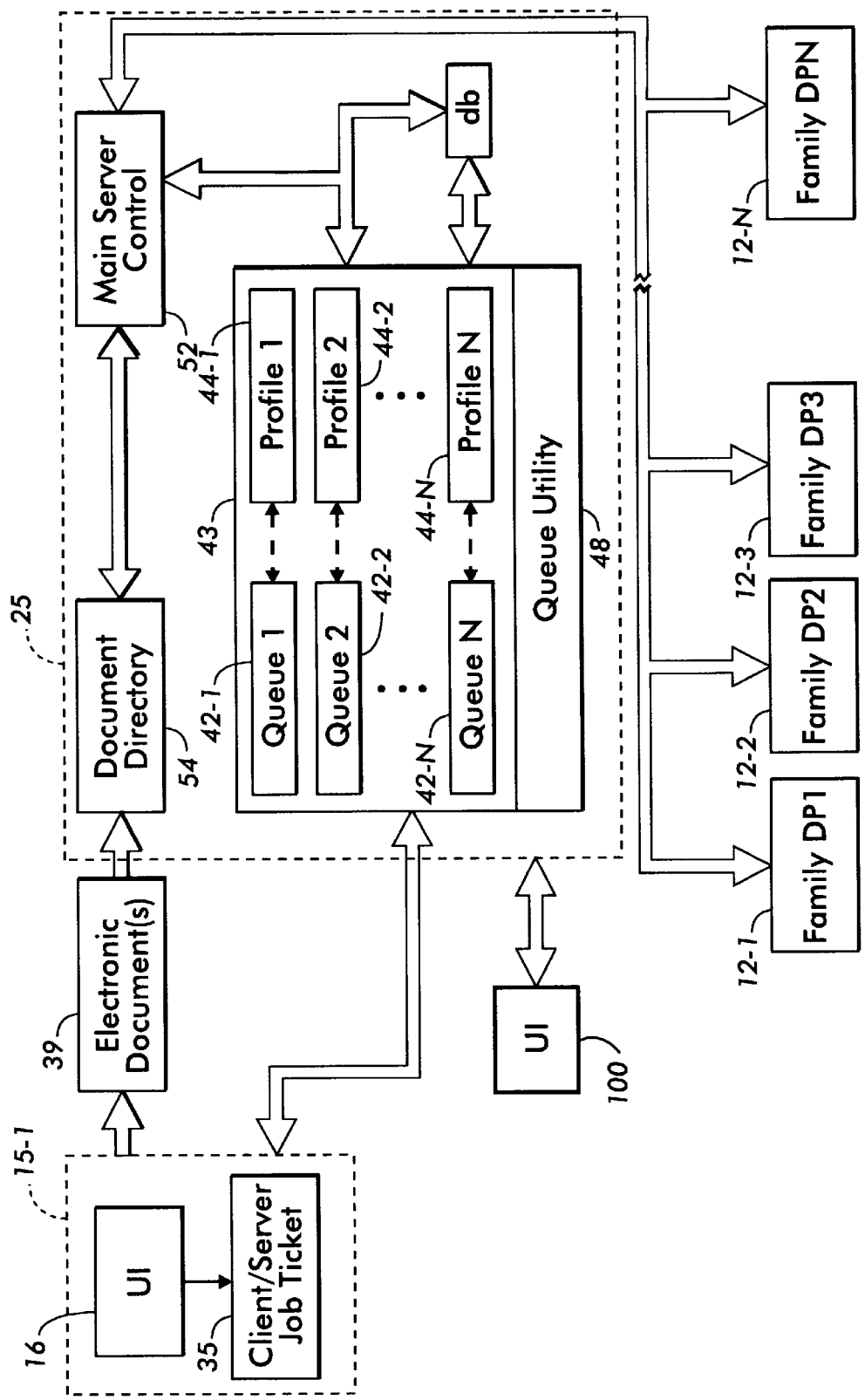
FIG. 2 is a partial, schematic, block diagram of the network printing system of FIG. 1.

Referring to FIG. 2, the relationship of a single client, such as client 15-1, to the server 25 is shown in further detail. In the illustrated embodiment of FIG. 2, the client 15-1 includes one of the UIs 16 and an electronic job ticket 35, which job ticket 35 permits the user to program an electronic document for transmission to the server 25. In general, the job ticket 35 includes information relating to attributes that characterize a document. It will be appreciated by those skilled in the art that the term "electronic job ticket" is broadly used herein for referring to both attributes (corresponded with selected values and control instructions used in conjunction with processing an electronic document.

More particularly, the attributes typically include job level attributes (e.g. set quantity, copy count, finishing requirements, plex and page numbering), page level attributes (e.g. stock color separation information, image quality, reduction/enlargement and sides to be imaged), and image level attributes (e.g. size of image, color of image, location of image relative to a page). In one example, electronic document(s) 39, which includes image and attribute related information, is transmitted from the client 15-1 to the server 25. Moreover, the job ticket, which is transmitted along with the electronic document(s), includes those control instructions necessary to facilitate processing of the electronic document.

It will be further appreciated by those skilled in the art that, as contemplated herein, the electronic document(s) and corresponding attributes/control instructions of the job ticket are commonly integrated into page description language (pdl) output represented by a single pdl data and the data stream is delivered from a suitable driver to a printer for processing thereof. Further description regarding the relationship between image data and job ticket information is provided in U.S. Pat. No. 5,504,843 to Catapano et al., the disclosure of which is incorporated herein by reference.

Figure 3:
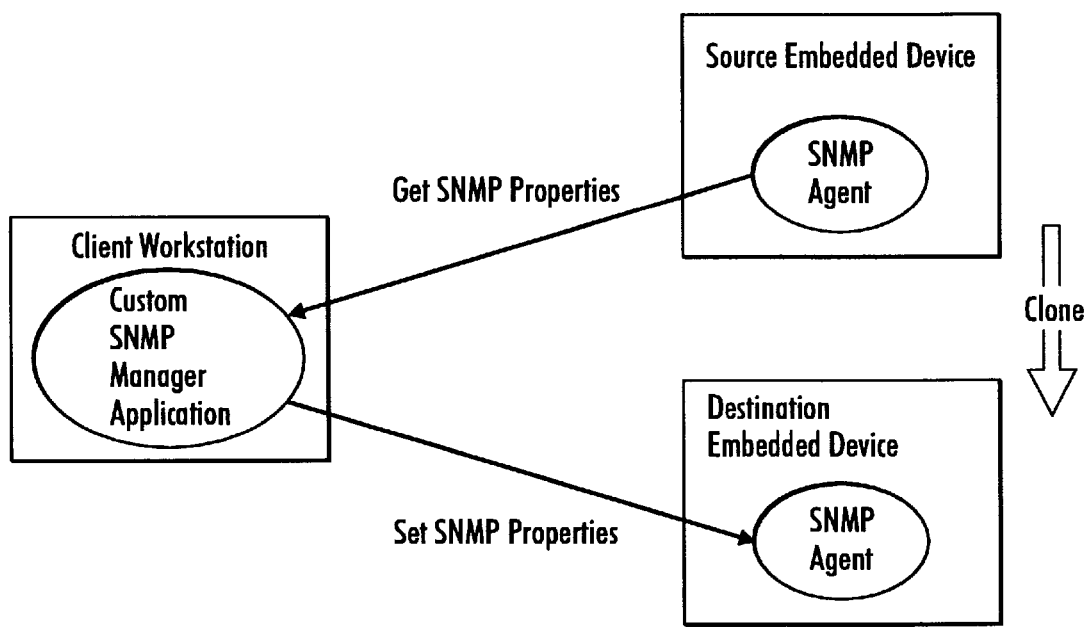
FIG. 3 is a schematic, block diagram of a system for copying document processing related settings from a Source Embedded Device to a Destination Embedded Device.

Referring to FIG. 3, a system for cloning properties from one document processing related device to another document processing related device, which is believed to be conventional, is shown. In the illustrated embodiment of FIG. 3, properties/settings are copied from one embedded device to another through use of a protocol such as SNMP. The settings are read from the source device by a custom SNMP manager application running on the Client Workstation and are then sent to the destination device by this same application.

The main disadvantage of this type of cloning approach stems from the requirement of having a Custom SNMP Manager Application. Since this Application requires that all parameters in a given device be comprehended, for purposes of cloning, the Application must be upgraded every time a parameter or attribute is added to the given device. Additionally, in accordance with the conventional approach to cloning, the Application must be ported to every Client Platform requiring support (i.e. in terms of Windows 3.1, OS/2, Windows 95, Mac, Unix, etc.). In many instances, a client will not be aware of the need to have the Application, for the purpose of cloning, so that, from the client's point of view, the Application, and thus cloning, are unavailable.

Another disadvantage of the illustrated embodiment is that transmission of properties or settings of an embedded device behind a "firewall" with respect to an embedded device outside of the firewall is impossible when an SNMP based protocol, such as User Datagram Protocol (UDP) is employed. More particularly, communication between the above-mentioned devices across the firewall is obtained with a proxy server using UDP and it has been found that UDP cannot be used to copy properties from a device behind the firewall to a device outside the firewall. Accordingly, when using UDP and a firewall, cloning of device properties is limited to local area networks. For many widely dispersed businesses this can be extremely undesirable.

Figure 4:
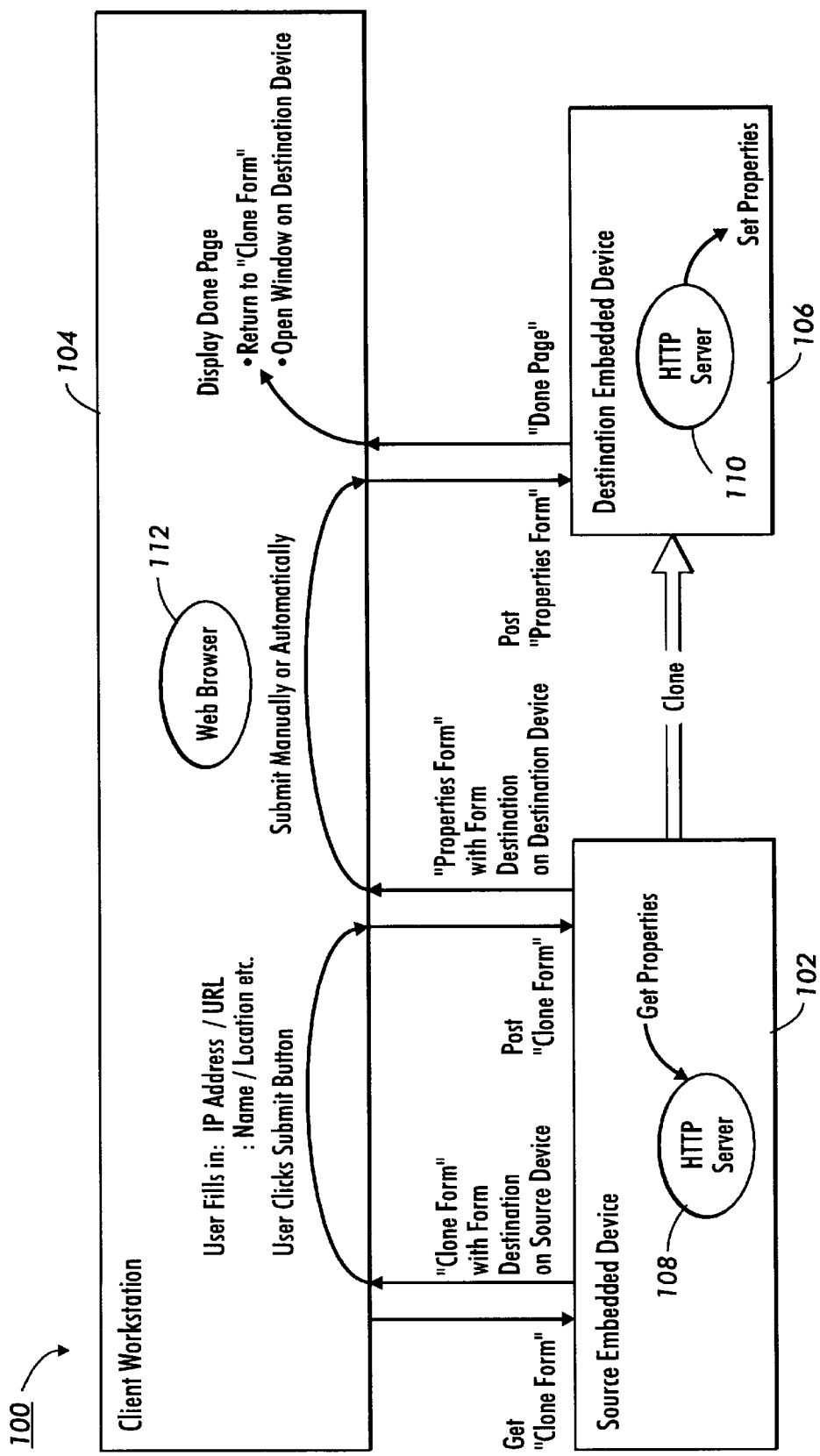
FIG. 4 is a schematic, block diagram of a system for using a Browser to copy document processing related settings from the Source Embedded Device to the Destination Embedded Device.

Referring to FIG. 4, an arrangement suitable for use in cloning properties from one document processing related device to another document processing related device is designated by the numeral 100. As contemplated by the illustrated embodiment of FIG. 4, a Source Embedded Device 102, e.g. any sort of image capture and/or image output device, a Web Browsing Subsystem 104, including a conventional web browser available from Microsoft or Netscape, and a Destination Embedded Device 106, e.g. any sort of image capture and/or image output device are communicatively coupled with one another by way of any suitable network. It is important that, for the sake of implementing the preferred embodiment, there is no limit to the extent of the network. For instance, the preferred embodiment is equally well suited for use on a local network or a wide area network.

Preferably, each of the Devices 102, 106 include services for getting properties and/or setting properties. As contemplated, the services include HTTP Servers 108 and 110; however, it will be understood that another service type device, such as a Secure HTTP Server or any other type of Web server could provide the property getting/setting functionality of Servers 108, 110. Moreover, it should be understood that while the Web Browsing Subsystem 104 is shown as a client workstation with a Browser 112, in other contemplated approaches the Web Browsing Subsystem could be integrated with the Source Embedded Device or made available to a client by way of a suitable server.

Figure 5:
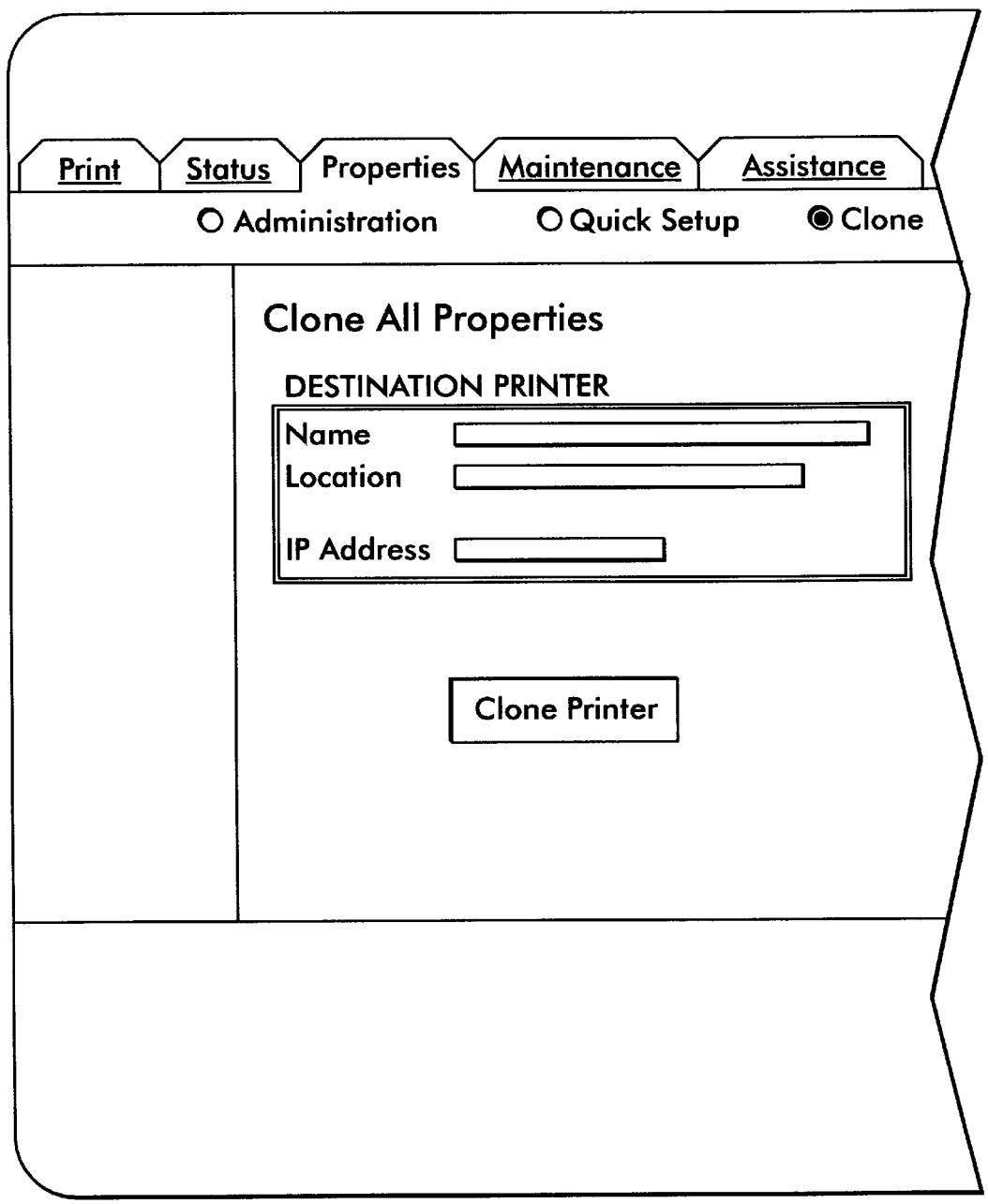
FIG. 5 is an elevational view of a dialog suitable for use as a "Clone Form" with the system of FIG. 4.

As shown in FIG. 4, cloning of properties with corresponding values (at Device 102) for use in the Device 106 is obtained with a flow pattern which is described by a set of suitably labeled flow arrows. In particular, the cloning technique of FIG. 4 employs the Browser 112 to copy a subset of properties from the Source Embedded Device 102 to the Destination Embedded Device 106. As will appear, the Web Browser 112, at least in one example, stores intermediate settings in a Form. Preferably the following steps occur between the Device 102 and the Browsing Subsystem 104:

A "Get" command is used to obtain a "Clone Form" (e.g. HTML Page) which allows a User of the Browser to enter an IP Address or URL (Uniform Resource Locator) of the Destination Embedded Device. Other settings that require customization in the Cloning Process, such as Device Name and Device Location should also be entered here. Referring to FIG. 5, an exemplary Clone Form, suitable for posting with the Source Embedded Device 102 is shown.

Figure 6:
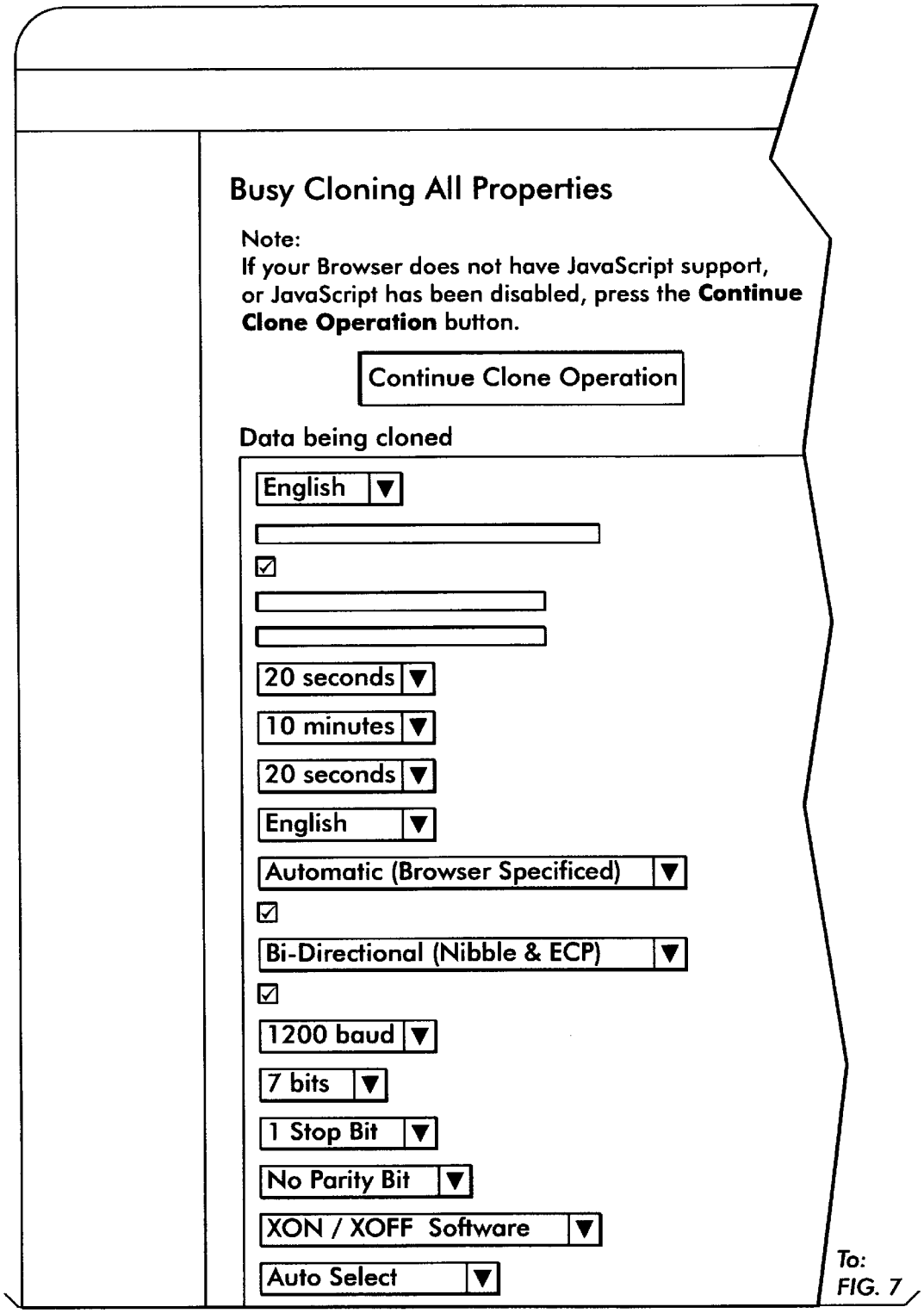
Figure 7:
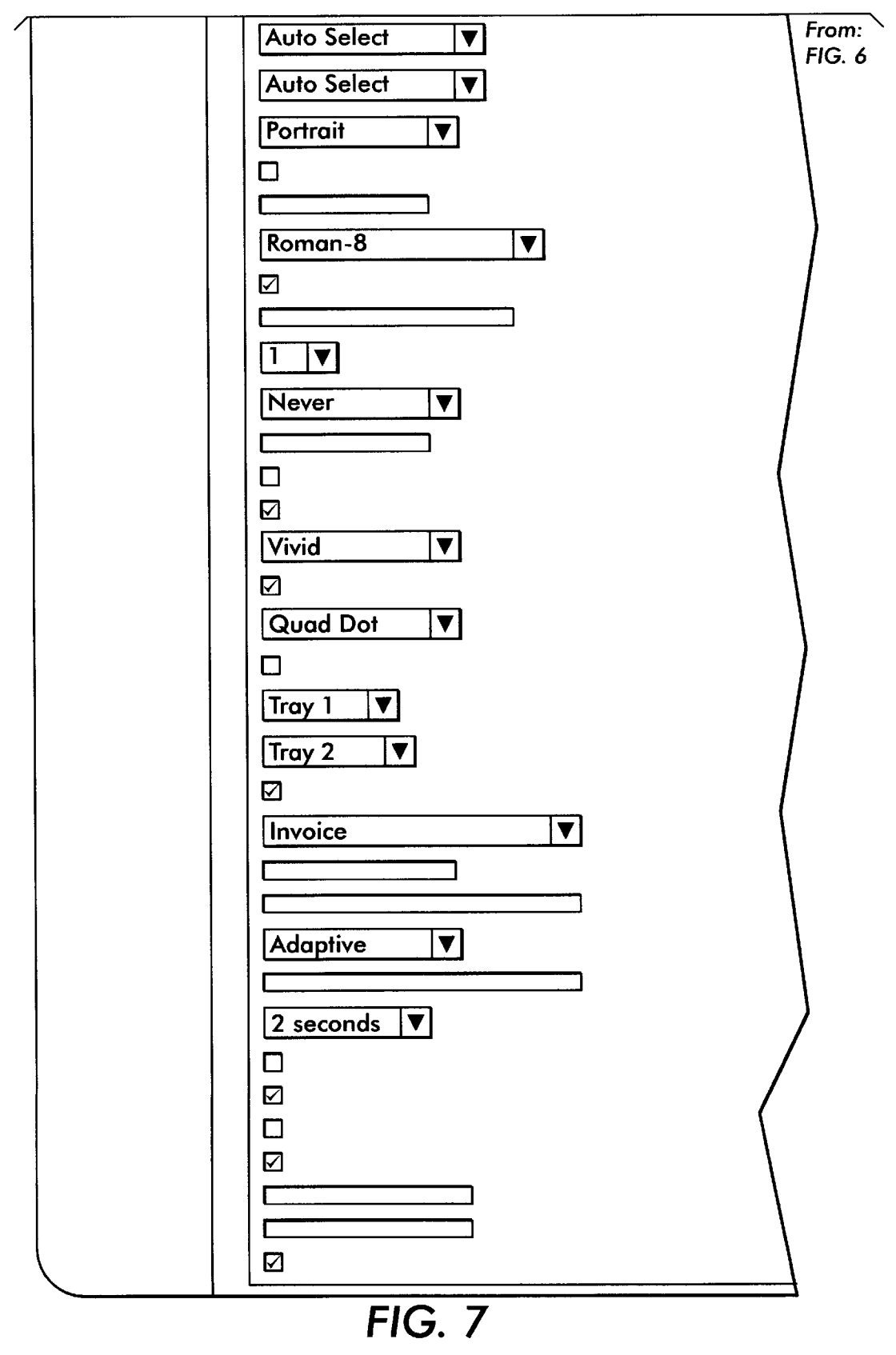

The Clone Form is then posted to the Source Embedded Device and the Device 102, using HTTP Service 108, responds by supplying a "Properties Form" which, in one embodiment, is an HTML Form containing selected Source Embedded Device Properties with corresponding property values. The destination of this Form may be indicated as a URL of the Destination Embedded Device, so that when the Form is posted it is sent to the Destination Device. Referring to FIGS. 6 and 7, an exemplary Properties Form suitable for use in posting property values to the Destination Embedded Device is shown. It will be appreciated that, in various applications of the preferred embodiment, many more property values than those shown in the Form of FIGS. 6 and 7 may be provided.

It should also be noted that the clone form could be hidden from view by making use of HTML constructs that result in the settings not being displayed.

Figure 8:
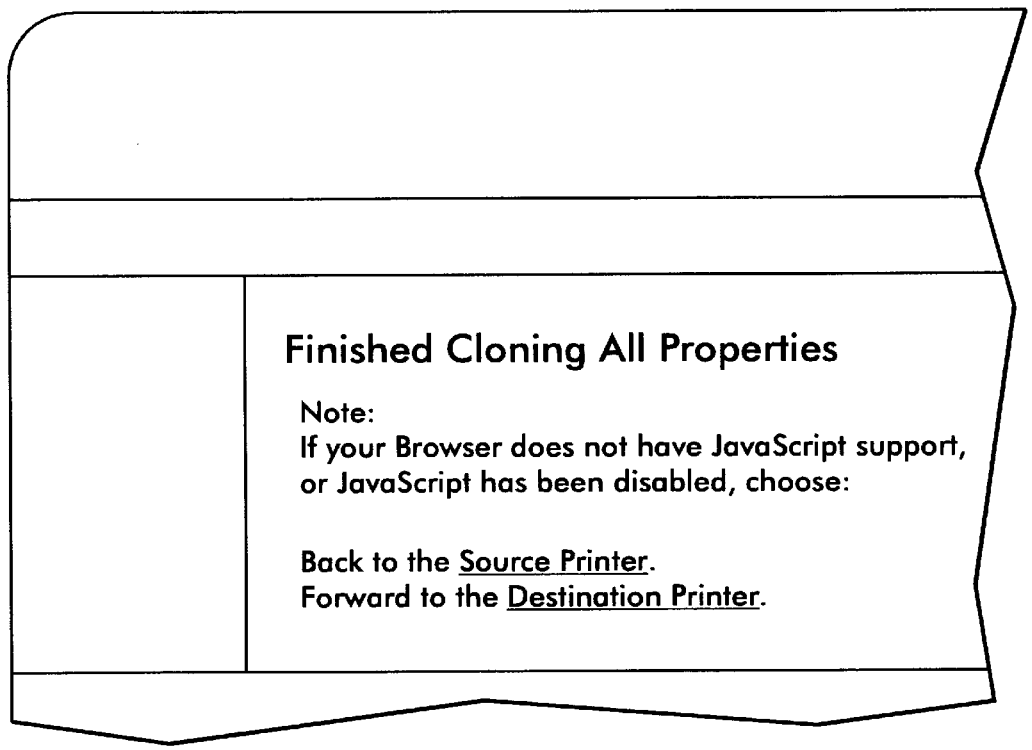
FIG. 8 is an elevational view of a dialog suitable for use as a "Done Page" with the system of FIG. 4.

Preferably the following steps occur between the Browsing Subsystem 104 and the Destination Embedded Device 106:

- The Properties Form is posted to the Device 106. This operation can be achieved either manually, with a basic Browser, or automatically with a more advanced Browser. In the event that a more advanced Browser is employed, a suitable program supports the capability of submitting the Properties Form automatically. For instance, automatic submission could be achieved through use of a program employing a conventional scripting language, such as JavaScript or Java ("Java" is a trademark of Sun Microsystems). In one example, a Java Applet may be used to provide automatic submission functionality. For detailed information regarding how to include an applet in an HTML page, reference can be made to a description referred to as "APPLET.tag" on Java.Sun.Com.
- The Destination Embedded Device Processes the Form and sets the relevant properties, with the HTTP Service 110 in the Destination Device 106. It will be appreciated that the Destination Embedded Device will preferably include some sort of security which prevents copying of unwanted property values thereto. Commonly, a Browser should not be able to access a Destination Device without some sort of clearance, such as a password. In response to setting property values at the Destination Embedded Device, the Device 106 replies by communicating a Done Page, such as the Done Page shown in FIG. 8.
- With Scripting, the "Done Page" can Jump Back to the Clone Form on the Source Device and open a window with a page from the Destination Device.

Various extensions of the above-described embodiment should be appreciated. For example, use of a Java Applet supplied by the Source Embedded Device, capable of reading a machine readable version of the property values of the Source Embedded Device, can post the values to the Destination Embedded Device 106. Additionally, the document processing system 100 of FIG. 4 is suitable for supporting properties of different groups, e.g. All Properties and Network Protocol Properties. Finally, Properties can be submitted directly from the Device 102 to the Device 106, provided one of the Devices 102, 106 is capable of operating as if it were a browser with respect to network protocols.

Figure 9:
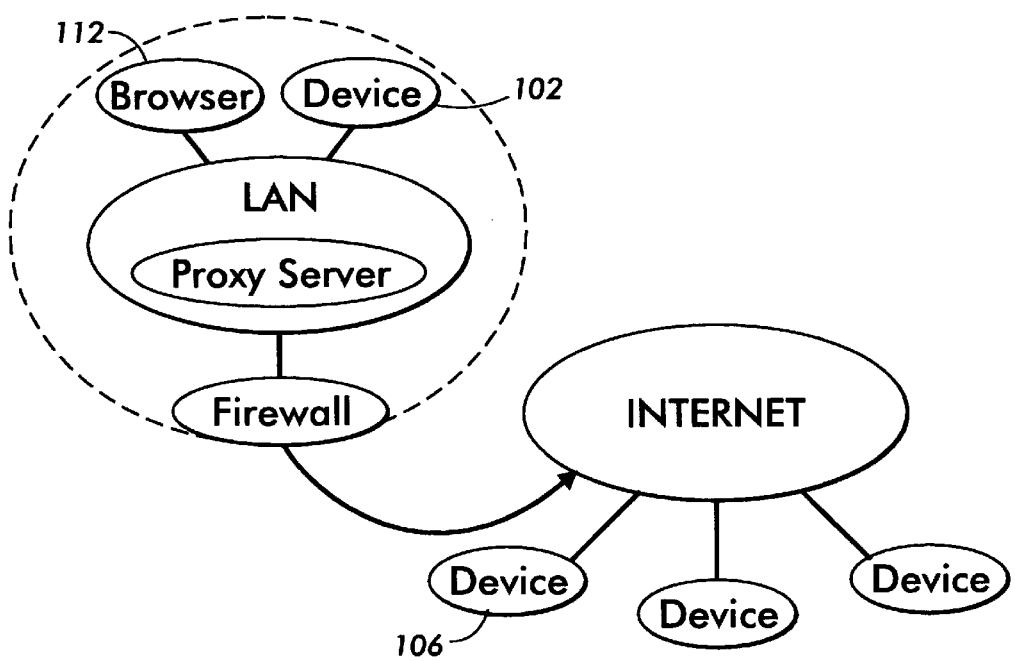
FIG. 9 is a schematic, block diagram representing a network environment in which the system of FIG. 4 can be used.

Referring briefly to FIG. 9, it will be recognized that the above-described system 100 can operate on the internet notwithstanding the existence of a firewall since the Browser 112 can cause properties from the Device 102 to be copied to the Device 106 across the firewall. This is accomplished by the fact that the Proxy Server forwards HTTP queries out through the firewall. The firewall only allows certain specific servers and protocols out to the Internet. The Browser can still cause the copying of the property values across the Firewall in accordance with the technique described above.

Numerous features of the above-described will be appreciated by those skilled in the art:

First, a system for configuring devices in a network document processing system where a set of document processing related settings are copied from a first document processing related device to a second document processing related device is made available to network users who might not normally possess a suitable utility enabling configuration across the network. With the system of the preferred embodiment a user need only possess browser software and have access to a corresponding network in order to configure or program a remotely disposed device with a set of document processing related settings.

Second, the configuration system can be performed directly between the first and second document processing related devices without requiring the supervision of a client administrator. That is, provided one of the first and second document processing related devices possesses browsing capability, client intervention is not required to initiate the above-mentioned copying process.

Third, provided the browsing subsystem is JAVA or Scripting Language capable, the set of document processing related settings can be submitted automatically from the first document processing related device to the second document processing related device.

Fourth, the copying process can be monitored readily across the network. For instance, with suitable scripting, a message indicating that the copying process is complete can be provided automatically across the network from the second document processing related device to the first document processing related device.

Finally, the copying system is suitable for use in both LANs and WANs. Since the system uses a network protocol that is suitable for transmission over a particularly wide area range, the set of document processing related settings can be transmitted between document processing devices separated by substantial distances or even a firewall.

What is claimed is:

1. A document processing system including a plurality of document processing related devices in which each of the document processing related devices communicates with one another by way of a network, comprising:

a first document processing related device with a set of document processing related settings, said document processing related device being programmed with the set of document processing related settings and including a writing service for writing a subset of the set of document processing related settings to one or more electronic pages;

a second document processing related device communicating with said first document processing related device and including a property programming service for programming said second document processing related device with the subset of the set of document processing related settings; and a network browsing system, communicating with both the writing service of said first document processing related device and the programming service of said second document processing related device, for causing the one or more electronic pages with the subset of the set of document processing related settings to be submitted from said first document processing related device to said second document processing related device so that the subset of the set of document processing related settings is read by the programming service, when a preselected condition is met, to program said second document processing related device in response to said reading of the subset of the set of document processing related settings by the programming service.

2. The document processing system of claim 1, further comprising a client communicating with both of said first and second document processing related devices and being disposed remotely of said first and second document processing related devices on the network, wherein said client includes said network browsing system.

3. The document processing system of claim 1, wherein said writing service and said programming service each comprise an HTTP service.

4. The document processing system of claim 1, wherein said network browsing system includes a program for submitting the one or more pages automatically to said second document processing related device.

5. The document processing system of claim 4, wherein said program is provided by way of one or more Java applets or Browser Scripts.

6. The document processing system of claim 4, in which the document processing system includes a user interface, with a display screen, communicating with the network, wherein said program causes a set of information to be displayed at the display screen, said information indicating that the subset of the set of document processing related settings has been copied to said second document processing related device.

7. The document processing system of claim 1, wherein said one or more electronic pages comprises at least one HTML form designating current values corresponding with the subset of the set of document processing related settings.

8. The document processing system of claim 1, wherein said first document processing related device and said network browsing system are disposed in a single document processing machine.

9. The document processing system of claim 1, wherein a firewall is disposed between said first document processing related device and said second document processing related device.

10. In a document processing system with a first document processing related device communicating with a second document processing related device by way of a network, the first document processing related device including a set of document processing related settings and a service for obtaining a subset of the set of document processing related settings, the second document processing related device including a service for programming the second document processing related device with the subset of the set of document processing related settings, the document processing system including a browser communicating with both the first document processing related device and the second document processing related device, a method for copying the subset of the set of document processing related settings from the first document processing related device to the second document processing related device, comprising:

a) using the browser to get an electronic page for the first document processing related device;

b) writing information in the electronic page, with the browser, to identify a location of the second document processing related device;

c) posting the electronic page with the written information to the first document processing related device;

d) using the obtaining service to provide the electronic page with the subset of the set of document processing related settings; and e) using the browser to submit the electronic page with the subset of the set of document processing related settings to the second document processing related device for programming the second document processing related device with the subset of the set of document processing related settings.

11. The method of claim 10, further comprising:

f) configuring the document processing system so that the browser resides in the first document processing related device.

12. The method of claim 10, in which the browser includes an interpretative program, wherein said (e) includes using the interpretative program to submit the electronic page with the subset of the set of document processing related settings to the second document processing related device.

13. The method of claim 10, in which a user interface with a display communicates with the network, further comprising:

f) displaying a message at the display, in response to said submitting, to indicate that the subset of the set of document processing related settings has been submitted to the second document processing related device.

14. The method of claim 10, in which the first document processing related device is separated from the second document processing related device by way of a firewall, wherein said (e) includes transmitting the subset of the set of document processing related settings across the firewall.

15. The method of claim 10, further comprising:

f) configuring the electronic page as an HTML form.

* * * * *